United States Patent
Ju et al.

(10) Patent No.: US 11,801,602 B2
(45) Date of Patent: Oct. 31, 2023

(54) MOBILE ROBOT AND DRIVING METHOD THEREOF

(71) Applicant: Samsung Electronics Co., Ltd., Suwon-si (KR)

(72) Inventors: Jaeyong Ju, Suwon-si (KR); Hyeran Lee, Suwon-si (KR); Hyunjung Nam, Suwon-si (KR); Miyoung Kim, Suwon-si (KR); Jaebum Park, Suwon-si (KR); Joonah Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 233 days.

(21) Appl. No.: 17/420,859

(22) PCT Filed: Jan. 2, 2020

(86) PCT No.: PCT/KR2020/000051
§ 371 (c)(1),
(2) Date: Jul. 6, 2021

(87) PCT Pub. No.: WO2020/141900
PCT Pub. Date: Jul. 9, 2020

(65) Prior Publication Data
US 2022/0063096 A1 Mar. 3, 2022

(30) Foreign Application Priority Data
Jan. 3, 2019 (KR) .................... 10-2019-0000667

(51) Int. Cl.
*B25J 9/16* (2006.01)
*B25J 19/02* (2006.01)
(Continued)

(52) U.S. Cl.
CPC ........... *B25J 9/1664* (2013.01); *B25J 9/1697* (2013.01); *B25J 11/0005* (2013.01); *B25J 19/023* (2013.01); *G05D 1/0246* (2013.01)

(58) Field of Classification Search
CPC .... B25J 9/1664; B25J 9/1697; B25J 11/0005; B25J 19/023; B25J 11/00; G05D 2201/0211; G05D 1/0246
See application file for complete search history.

(56) References Cited

U.S. PATENT DOCUMENTS 9,321,173 B2   4/2016   Kikkeri et al.
10,362,277 B2  7/2019   Chae et al.
(Continued)

FOREIGN PATENT DOCUMENTS

CN   104102220 A  * 10/2014
JP   2008-200843    9/2008
(Continued)

OTHER PUBLICATIONS

Search Report and Written Opinion dated Apr. 10, 2020 in counterpart International Patent Application No. PCT/KR2020/000051 and English-language translation.
(Continued)

*Primary Examiner* — Robert T Nguyen
(74) *Attorney, Agent, or Firm* — Nixon & Vanderhye, P.C.

(57) ABSTRACT

Provided are a mobile robot and a method of driving the same. A method in which the mobile robot moves along with a user includes photographing surroundings of the mobile robot, detecting the user from an image captured by the photographing, tracking a location of the user within the image as the user moves, predicting a movement direction of the user, based on a last location of the user within the image, when the tracking of the location of the user is (Continued)

stopped, and determining a traveling path of the mobile robot, based on the predicted movement direction of the user.

14 Claims, 12 Drawing Sheets

(51) Int. Cl.
    *G05D 1/02*     (2020.01)
    *B25J 11/00*     (2006.01)

(56) References Cited

U.S. PATENT DOCUMENTS

| | | | |
|---|---|---|---|
| 11,076,734 | B2 * | 8/2021 | Lee ................. A47L 9/2842 |
| 2010/0222925 | A1 | 9/2010 | Anezaki |
| 2012/0316680 | A1 | 12/2012 | Olivier, III et al. |
| 2014/0249673 | A1 | 9/2014 | Lin |
| 2017/0368690 | A1 | 12/2017 | Li et al. |
| 2017/0368691 | A1 | 12/2017 | Li |
| 2018/0181137 | A1 | 6/2018 | Choi et al. |
| 2018/0259971 | A1 | 9/2018 | Nishimura |
| 2018/0370037 | A1 | 12/2018 | Han |
| 2019/0090711 | A1 * | 3/2019 | Lee ................. A47L 9/2842 |

FOREIGN PATENT DOCUMENTS

| | | |
|---|---|---|
| KR | 10-2011-0092502 | 8/2011 |
| KR | 10-2014-0031316 | 3/2014 |
| KR | 10-2016-0077531 | 7/2016 |
| KR | 10-2018-0058004 | 5/2018 |
| KR | 10-2018-0106178 | 10/2018 |

OTHER PUBLICATIONS

Notice of Non-Final Office dated Feb. 17, 2021 in counterpart Action Korean Patent Application No. 10-2019-0000667 and English-language translation.
Notice of Last Non-Final Office dated Aug. 4, 2021 in counterpart Action Korean Patent Application No. 10-2019-0000667 and English-language translation.
LED Animated Snowfall Tubes|Pro Christmas, Nov. 10, 2017, http://www.youtube.com/watch?v=P6eK-Z1YHa4.

* cited by examiner

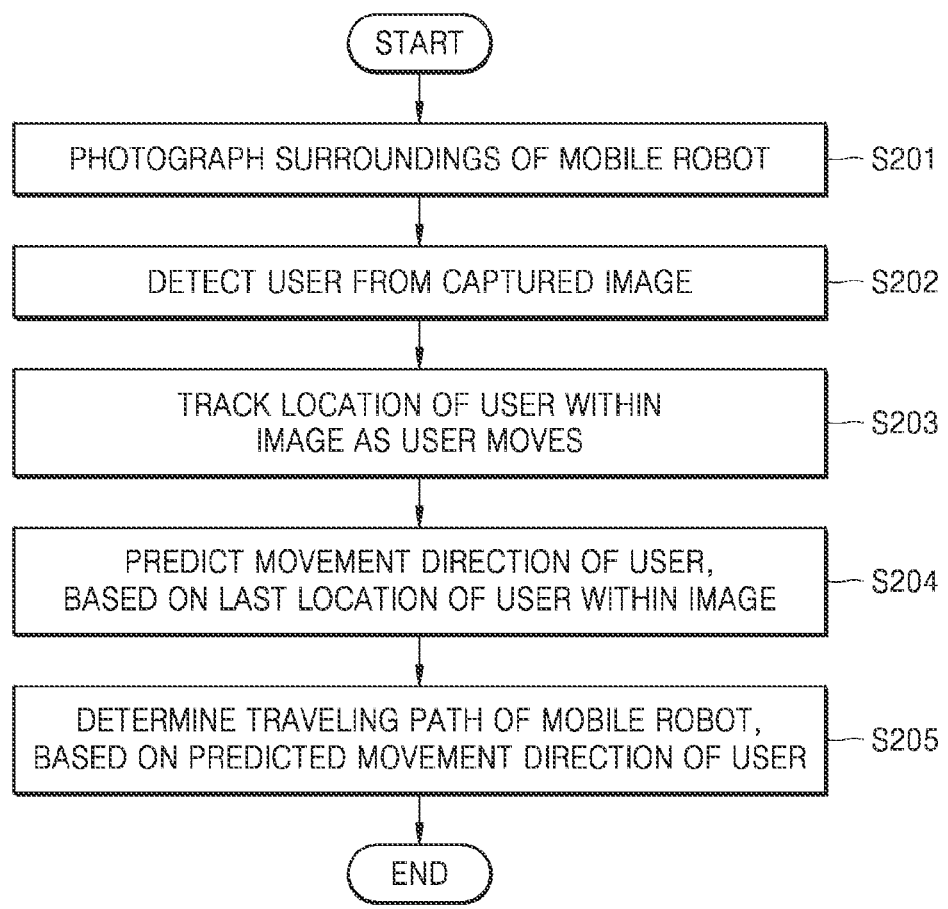

FIG. 8
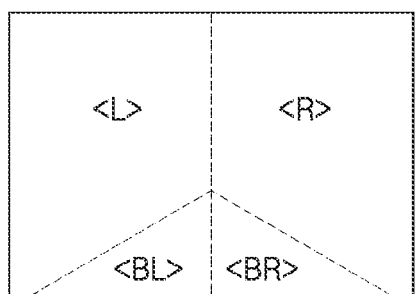
(a)
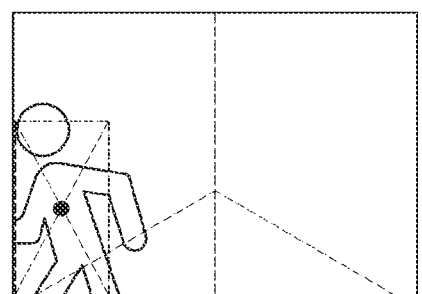
(b)
| BOUNDING BOX CENTER POINT LOCATIONS | ROTATION DIRECTIONS/CAMERA ANGLE ADJUSTMENT DIRECTIONS |
|---|---|
| <L> | Left Rotation / X |
| <R> | Righ Rotation / X |
| <BL> | Left Rotation / Down |
| <BL> | Righ Rotation / Down |
(c)

FIG. 10
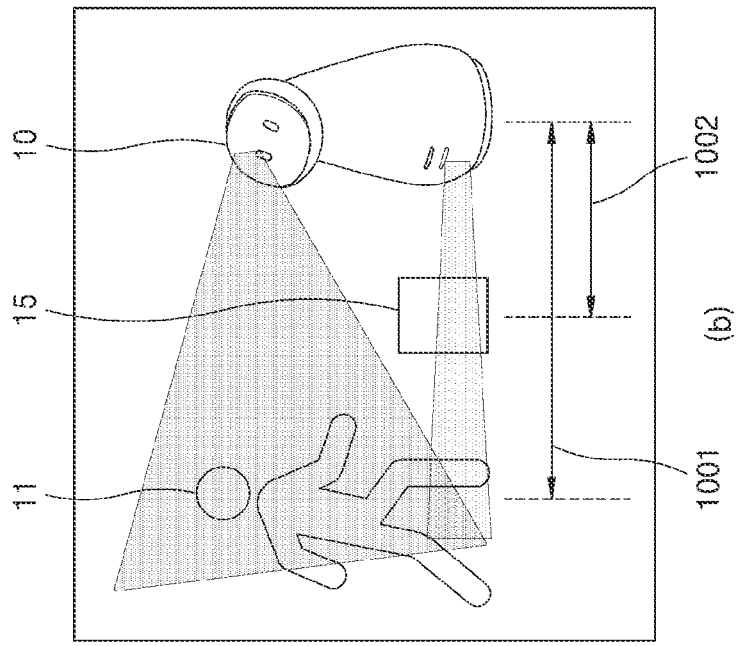
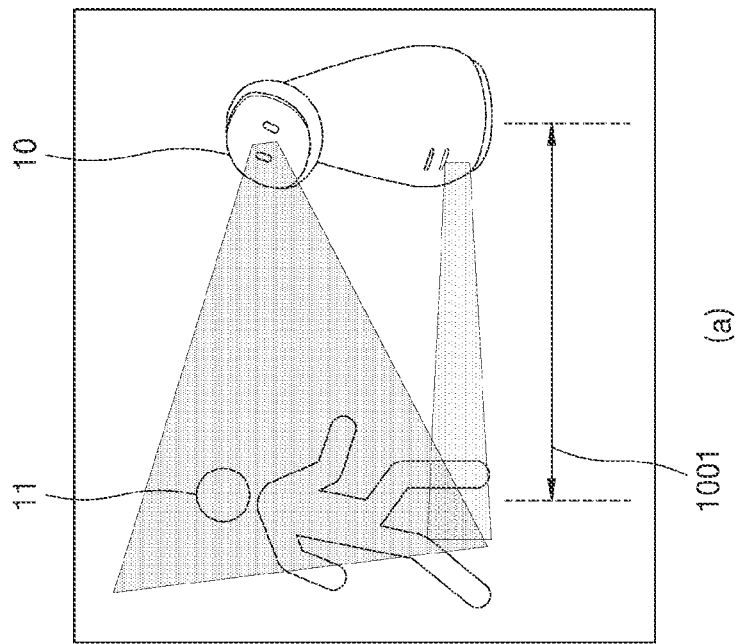

MOBILE ROBOT AND DRIVING METHOD THEREOF

This application is the U.S. national phase of International Application No. PCT/KR2020/000051 filed 2 Jan. 2020, which designated the U.S. and claims priority to KR Patent Application No. 10-2019-0000667 filed 3 Jan. 2019, the entire contents of each of which are hereby incorporated by reference.

BACKGROUND

Field

The present disclosure relates to mobile robots and driving methods thereof, and more particularly, to a mobile robot capable of determining a traveling path by predicting a movement direction of a user when tracking of the user is interrupted while the mobile robot is moving along with the user, and a method of driving the mobile robot.

Description of Related Art

Recently, a camera-type following system has been adopted, in which a camera capable of observing the surroundings of a mobile robot is installed on the mobile robot, and a following path for following a user is obtained by analyzing an image from the camera.

However, according to this following method, when a distance between a moving user and a mobile robot increases, a user deviates from a camera vision field range of the mobile robot, or an obstacle is located between the user and the mobile robot, the mobile robot cannot determine an appropriate traveling path to follow the user.

In addition, when the quality of an image of a mobile robot is low, the mobile robot cannot accurately recognize a user or an obstacle, and thus cannot determine an appropriate traveling path to follow the user.

SUMMARY

Provided are a mobile robot capable of determining a traveling path for resuming tracking of a user by predicting a movement direction of the user, when the tracking of the user is interrupted while the mobile robot is moving along with the user, and a method of driving the mobile robot.

Objectives of the present disclosure are not limited to the above-mentioned objects, and other objects and advantages of the present disclosure that are not mentioned may be understood by the following description, and will be more clearly understood by embodiments of the present disclosure. In addition, it will be easily understood that the objectives and advantages of the present disclosure may be realized by the means shown in the claims and combinations thereof.

According to an aspect of the present disclosure, a method in which the mobile robot moves along with a user includes photographing surroundings of the mobile robot, detecting the user from an image captured by the photographing, tracking a location of the user within the image as the user moves, predicting a movement direction of the user, based on a last location of the user within the image, when the tracking of the location of the user is stopped, and determining a traveling path of the mobile robot, based on the predicted movement direction of the user.

According to another aspect of the present disclosure, a mobile robot that moves along with a user includes at least one camera; a memory storing one or more instructions; and at least one processor configured to execute the one or more instructions to control the mobile robot. The at least one processor is configured to execute the one or more instructions to photograph surroundings of the mobile robot through the at least one camera, detect the user from an image captured by the photographing, track a location of the user within the image as the user moves, predict a movement direction of the user, based on a last location of the user within the image, when the tracking of the location of the user is stopped, and determine a traveling path of the mobile robot, based on the predicted movement direction of the user.

According to another aspect of the present disclosure, a computer program device includes a non-transitory computer-readable recording medium having recorded thereon a computer program, which, when executed by a computer, performs the method.

According to the present disclosure, provided are a mobile robot capable of determining a traveling path for resuming tracking of a user by predicting a movement direction of the user, when the tracking of the user is interrupted while the mobile robot is moving along with the user, and a method of driving the mobile robot.

BRIEF DESCRIPTION OF THE DRAWINGS

FIG. 2 is a flowchart of a method of driving a mobile robot, according to some embodiments.

FIG. 8 illustrates an example where a mobile robot according to some embodiments determines a rotation direction and a camera angle adjustment direction of the mobile robot, based on a predicted movement direction of a user.

FIG. 10 illustrates an example of a controlling method according to obstacle recognition by a mobile robot according to some embodiments.

DETAILED DESCRIPTION

Figure 1A:
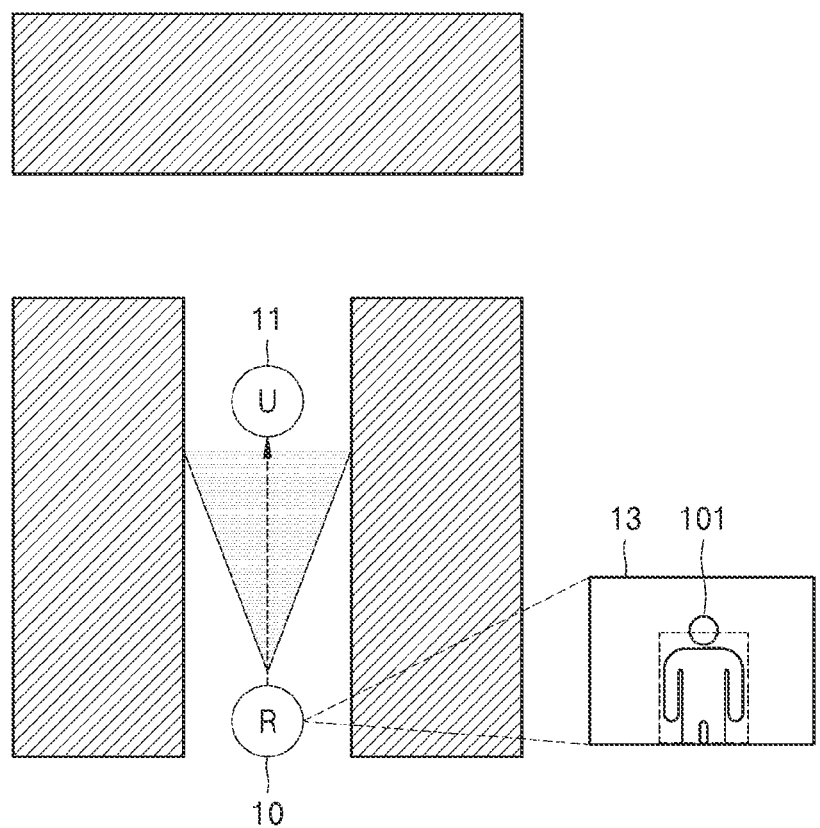
FIGS. 1A and 1B illustrate a mobile robot that moves along with a user, according to some embodiments.

The above-described objects, features, and advantages will be described in detail later with reference to the accompanying drawings, and accordingly, a person of ordinary skill in the art to which the present disclosure pertains will be able to easily implement the technical spirit of the present disclosure. In the description of the present disclosure, certain detailed explanations of the related art are omitted when it is deemed that they may unnecessarily obscure the essence of the present disclosure. Embodiments of the present disclosure will now be described fully with reference to the accompanying drawings. In the drawings, the same reference numerals are used to indicate the same or similar elements.

Figure 1B:
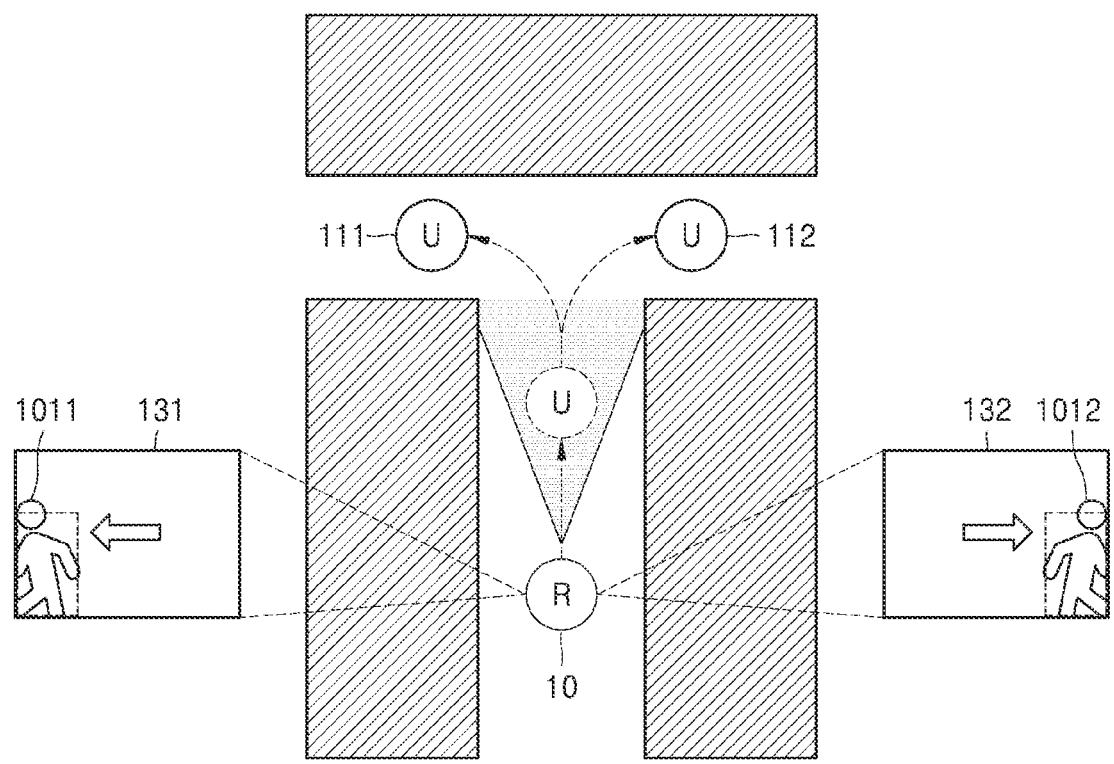

FIGS. 1A and 1B illustrate a mobile robot that moves along with a user, according to some embodiments.

Referring to FIG. 1A, a mobile robot 10 according to some embodiments may travel by following a user 11 who moves in a certain space.

For example, when a preset user-following traveling start condition is satisfied, the mobile robot 10 may start a following movement to follow the user 11. For example, when a predetermined voice command is input from the user 11, the mobile robot 10 may start a following movement to follow the user 11. As another example, when a predetermined gesture command is input from the user 11, the mobile robot 10 may start a following movement to follow the user 11.

The mobile robot 10 may capture an image 13 of the surroundings of the mobile robot 10, through at least one camera included in the mobile robot 10.

For example, the mobile robot 10 may capture an image of the front of the mobile robot 10, through one camera that photographs a direction in which the mobile robot 10 moves. As another example, the mobile robot 10 may capture an image of the surroundings of the mobile robot 10, through a plurality of cameras. The number of cameras included in the mobile robot 10, the viewing angle of a camera lens, and a photographing quality may vary according to the specifications, purposes, and performance of the mobile robot 10.

The mobile robot 10 may detect the user 11 from the image 13.

For example, based on a result of comparing respective images for frames obtained from the image 13 captured through the at least one camera included in the mobile robot 10, the mobile robot 10 may extract an object included in each of the images for the frames.

For example, the mobile robot 10 may obtain a color difference by comparing the colors of respective RGB images for the frames of the image 13, and may extract objects from the respective RGB images for the frames, based on the obtained color difference.

The mobile robot 10 may detect an object corresponding to the body of a user by analyzing the objects extracted from the image 13. For example, the mobile robot 10 may detect at least one of the body and the face of the user by analyzing the objects extracted from the image 13. The mobile robot 10 may detect one or more users 101 from the image 13, based on the detected at least one of the body and the face of the user.

For example, the mobile robot 10 may generate a bounding box that surrounds the body of the user 101 within the image 13, in order to detect the user 101.

For example, the mobile robot 10 may generate respective bounding boxes for all of the objects included in the image 13, and may respectively allocate the bounding boxes to the objects. The generated bounding box may be used as a boundary that distinguishes the body of the user from the background or distinguishes users from each other. The bounding box generated to detect the user 101 may be used as a basis for determining an accurate location of the user within the image 13.

User detection according to the present disclosure may include not only detection of a user from among all of the objects within an image but also detection of a specific user from among a plurality of users within the image. For example, the mobile robot 10 may detect a specific user who is a target of a following movement, from among a plurality of users in the image 13.

For example, the mobile robot 10 may detect a specific user from the image 13 by comparing the detected at least one of the body and the face of the user with pre-registered user information. The mobile robot 10 may determine a specific user who is a target of the following movement from among the plurality of users in the image 13, by detecting the specific user within the image 13.

For example, when tracking of a user is interrupted, the mobile robot 10 may re-detect a previously-followed specific user from the image 13 and thus may resume the user-following movement through tracking and traveling of the user within the image 13.

Referring to FIG. 1B, the mobile robot 10 according to some embodiments may travel by following a user who moves by changing a direction in a certain space. As the user moves within the certain space, the mobile robot 10 may track a location of the user within a captured image.

For example, when the user rotates to the left at an end of a corridor and moves (111), the locations of users 1011 within respective images for the frames of an image 131 may also move to the left. As the location of the user 1011 moves to the left, the mobile robot 10 may generate a bounding box that surrounds the body of the user 1011 moved to the left for each of the respective images for the frames of the image 131. The location of the bounding box generated on each of the respective images for the frames may move to the left in correspondence with the location of the user 1011 moved to the left within each of the respective images for the frames.

On the other hand, when the user rotates to the right and moves at the end of the corridor (112), the location of a user 1012 within an image 132 may also move to the right. As the location of the user 1012 moves to the right, the mobile robot 10 may generate a bounding box that surrounds the body of the user 1012 moved to the right with respect to each of the respective images for the frames of the image 132. The location of the bounding box generated on each of the respective images for the frames may move to the right in correspondence with the location of the user 1012 moved to the right within each of the respective images for the frames.

The mobile robot 10 may stop tracking of the location of the user according to a preset criterion.

For example, when the user rotates to the left or right at the end of the corridor and moves (111 or 112) and thus the user 1011 or 1012 completely disappears from the image 131 or 132, the mobile robot 10 may stop tracking of the location of the user 1011 or 1012.

When tracking of the location of the user is stopped, the mobile robot 10 may predict a movement direction of the user, based on a final location of the user within an image. The last location of a center point of a bounding box refers to a center point location of the bounding box on an image of a last frame from among the frames having bounding boxes that surround the body of the user. For example, the mobile robot 10 may check respective images for the frames of an image and obtain a last location of the center points of a bounding box that surround the body of the user, thereby predicting a movement direction of the user.

The mobile robot 10 may determine a traveling path thereof, based on the predicted movement direction of the user. The traveling path determined by the mobile robot 10 may include, for example, at least one of a distance by which the mobile robot 10 is to travel after the moment when the traveling path is determined, and a direction in which the mobile robot 10 is to rotate after the moment when the traveling path is determined.

FIG. 2 is a flowchart of a method of driving a mobile robot, according to some embodiments.

Referring to FIG. 2, in operation S201, the mobile robot 10 may photograph the surroundings of the mobile robot 10.

For example, the mobile robot 10 may capture an image of the front of the mobile robot 10, through one camera that photographs a direction in which the mobile robot 10 moves. For example, the mobile robot 10 may capture an image of the surroundings of the mobile robot 10, through a plurality of cameras that photograph a direction in which the mobile robot 10 moves.

In operation S202, the mobile robot 10 may detect a user from the captured image. For example, based on a result of comparing respective images for frames obtained from the image captured through the at least one camera included in the mobile robot 10, the mobile robot 10 may extract an object included in each of the respective images for the frames.

The mobile robot 10 may detect at least one of the body and the face of the user by analyzing the objects extracted from the image. The mobile robot 10 may detect the user, based on the detected at least one of the body and the face of the user.

For example, the mobile robot 10 may analyze the extracted objects and thus may generate a bounding box that surrounds the body of the user 101 detected within the image.

When a plurality of users are detected from an image during user detection, the mobile robot 10 according to an embodiment may set a traveling mode related to user location tracking and following traveling so that the traveling mode is suitable for an environment where the plurality of users exist.

For example, while the mobile robot 10 is traveling by following a user detected from an image, the mobile robot 10 may determine validity for the user who is followed according to a preset cycle, namely, whether the user who is followed corresponds to an existing user that is followed.

For example, when a plurality of users are detected from an image, the mobile robot 10 may increase the number of determinations of the validity for a specific user who is followed for traveling, namely, determinations as to whether the specific user corresponds to an existing user who is followed. For example, when the plurality of users are detected from the image, the mobile robot 10 may relatively reduce a traveling speed for the user who is being followed.

In other words, when the plurality of users are detected from the image, the mobile robot 10 may set the traveling mode related to user location tracking and following traveling so that the traveling mode is suitable for the environment where the plurality of users exist, in order to remove the risk of generation of an error of following a wrong user other than a to-be-followed user.

On the other hand, when a single user is detected from an image during user detection, the mobile robot 10 according to an embodiment may set the traveling mode related to user location tracking and following traveling so that the traveling mode is suitable for an environment where the single user exists.

For example, when a single user is detected from an image, the mobile robot 10 may decrease the number of determinations of the validity for a user who is followed, namely, determinations as to whether the user corresponds to an existing user that is followed. For example, when the single user is detected from the image, the mobile robot 10 may relatively increase the traveling speed for the user who is being followed.

In other words, when the single user is detected from the image, the risk of generation of an error of following a wrong user other than a to-be-followed user is low, and thus the mobile robot 10 may set the traveling mode related to user location tracking and following traveling so that the traveling mode is suitable for the environment where the single user exists, in order to achieve efficient data processing.

According to some embodiments, the mobile robot 10 may adjust the angle of the camera included in the mobile robot 10 in order to perform learning for detection and recognition of a user. For example, the mobile robot 10 may adjust the angle of the camera, based on a face location of a user who is photographed by the camera.

An example of a method, performed by a mobile robot according to some embodiments, of adjusting the angle of a camera will be described later with reference to FIG. 3.

Next, in operation S203, as the user moves, the mobile robot 10 may track a location of the user within the captured image.

When tracking of the location of the user is stopped according to a preset criterion, the mobile robot 10 may predict the movement direction of the user, based on the last location of the user within the image, in operation S204.

For example, when tracking of the location of the user is stopped, the mobile robot 10 may analyze respective images for the frames of the image and check the last location of the center point of a bounding box that surrounds the body of the user, thereby predicting the movement direction of the user.

An example in which a mobile robot according to some embodiments tracks the location of the user, based on a change in the location of the center point of the bounding box within the image will be described later with reference to FIG. 5.

In operation S203, the mobile robot 10 may determine a traveling path thereof, based on the predicted movement direction of the user.

Figure 3:
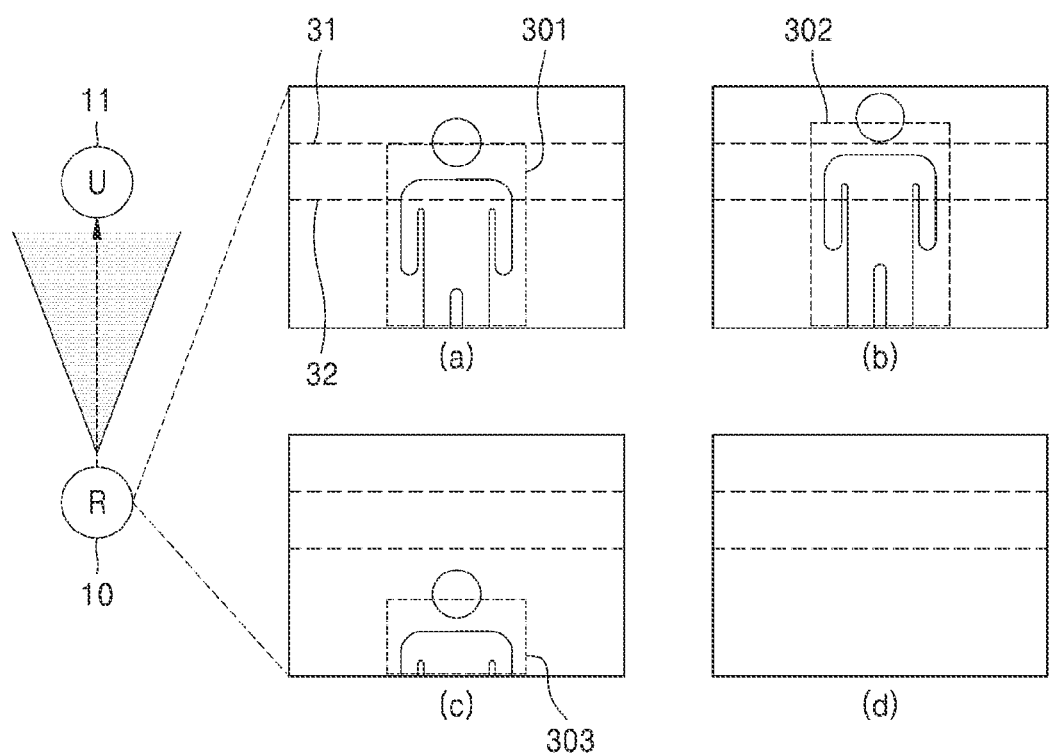
FIG. 3 illustrates a method, performed by a mobile robot according to some embodiments, of adjusting the image capturing angle of a camera.

FIG. 3 illustrates a method, performed by a mobile robot according to some embodiments, of adjusting the image capturing angle of a camera.

The mobile robot 10 according to some embodiments may perform registration or learning for at least one of determination as to whether a preset user-following traveling start condition is satisfied and body recognition of a user.

The mobile robot 10 may obtain respective RGB images for the frames of an image to detect a user included in the image. For example, the mobile robot 10 may generate a bounding box that surrounds the body of the user, in order to detect the user within the image.

For example, to increase accuracy of detection and recognition of the user, the mobile robot 10 may adjust the image capturing angle of the camera, by controlling the camera, based on the location of a bounding box that surrounds the body of the user within a current image.

Referring to (a) of FIG. 3, a first image captured through the camera of the mobile robot 10 when a photographing angle of the camera is a first angle is illustrated.

For example, the mobile robot 10 may preset a first boundary line 31 and a second boundary line 32 within an image, in order to find an optimal user photographing angle for performing the registration or learning. The preset first boundary line 31 and the preset second boundary line 32 may serve as a criterion for determining a relative location of a bounding box that surrounds the body of the user.

In the first image, an upper side of a first bounding box 301 surrounding the body of the user may be located between the first boundary line 31 and the second boundary line 32.

When the upper side of the first bounding box 301 is located between the first boundary line 31 and the second boundary line 32, the mobile robot 10 may determine that the photographing angle of the camera is appropriate, and may start learning for body recognition of the user. The mobile robot 10 may perform registration of a specific user, through a result of the learning.

Referring to (b) of FIG. 3, a second image captured through the camera of the mobile robot 10 when the photographing angle of the camera is a second angle is illustrated.

In the second image, an upper side of a second bounding box 302 surrounding the body of the user may deviate from between the first boundary line 31 and the second boundary line 32 and may be located over the first boundary line 31.

When the upper side of the second bounding box 302 is located over the first boundary line 31, the mobile robot 10 may determine that the photographing angle of the camera is not appropriate, and may adjust the photographing angle of the camera relatively upwards so that the upper side of the second bounding box 302 is located between the first boundary line 31 and the second boundary line 32.

When the upper side of the second bounding box 302 is located between the first boundary line 31 and the second boundary line 32 through the adjustment of the photographing angle, the mobile robot 10 may determine that the photographing angle of the camera is appropriate, and may start learning for body recognition of the user.

Referring to (c) of FIG. 3, a third image captured through the camera of the mobile robot 10 when the photographing angle of the camera is a third angle is illustrated.

In the third image, an upper side of a third bounding box 303 surrounding the body of the user may deviate from between the first boundary line 31 and the second boundary line 32 and may be located under the first boundary line 32.

When the upper side of the third bounding box 303 is located under the second boundary line 32, the mobile robot 10 may determine that the photographing angle of the camera is not appropriate, and may relatively adjust the photographing angle of the camera downwards so that the upper side of the third bounding box 303 is located between the first boundary line 31 and the second boundary line 32.

When the upper side of the third bounding box 303 is located between the first boundary line 31 and the second boundary line 32 through the adjustment of the photographing angle, the mobile robot 10 may determine that the photographing angle of the camera is appropriate, and may start learning for body recognition of the user.

Referring to (d) of FIG. 3, a fourth image captured through the camera of the mobile robot 10 when the photographing angle of the camera is a fourth angle is illustrated.

In the fourth image, the third bounding box 303 surrounding the body of the user may not be generated. In other words, when the photographing angle of the camera of the mobile robot 10 is the fourth angle, no users may exist in the fourth image. In this case, the mobile robot 10 may determine that the photographing angle of the camera is appropriate, and at the same time may be switched to a learning standby state without adjusting the photographing angle of the camera.

To increase accuracy of detection and recognition of the user, the mobile robot 10 according to an embodiment may adjust the image capturing angle of the camera, by moving a certain distance in a direction away from or closer to the user based on the location of a bounding box that surrounds the body of the user within a current image.

Referring back to (a) of FIG. 3, for example, the mobile robot 10 may preset the first boundary line 31 and the second boundary line 32 within the image, in order to find an optimal user photographing angle for performing the registration or learning. The preset first boundary line 31 and the preset second boundary line 32 may serve as a criterion for determining a relative location of a bounding box that surrounds the body of the user.

In the first image, the upper side of the first bounding box 301 surrounding the body of the user may be located between the first boundary line 31 and the second boundary line 32.

When the upper side of the first bounding box 301 is located between the first boundary line 31 and the second boundary line 32, the mobile robot 10 may determine that the photographing angle of the camera is appropriate, and may start learning for body recognition of the user. The mobile robot 10 may perform registration of a specific user, through a result of the learning.

Referring to (b) of FIG. 3, the second image captured through the camera of the mobile robot 10 when the photographing angle of the camera is the second angle is illustrated.

In the second image, the upper side of the second bounding box 302 surrounding the body of the user may deviate from between the first boundary line 31 and the second boundary line 32 and may be located over the first boundary line 31.

When the upper side of the second bounding box 302 is located over the first boundary line 31, the mobile robot 10 may determine that the photographing angle of the camera is not appropriate, and may move a certain distance in the direction away from the user so that the upper side of the second bounding box 302 is located between the first boundary line 31 and the second boundary line 32.

When the upper side of the second bounding box 302 is located between the first boundary line 31 and the second boundary line 32 due to the movement in the direction away from the user, the mobile robot 10 may determine that the photographing angle of the camera is appropriate, and may start learning for body recognition of the user.

Referring to (c) of FIG. 3, the third image captured through the camera of the mobile robot 10 when the photographing angle of the camera is the third angle is illustrated.

In the third image, the upper side of the third bounding box 303 surrounding the body of the user may deviate from between the first boundary line 31 and the second boundary line 32 and may be located under the first boundary line 32.

When the upper side of the third bounding box 303 is located under the second boundary line 32, the mobile robot 10 may determine that the photographing angle of the camera is not appropriate, and may move a certain distance in the direction closer to the user so that the upper side of the second bounding box 303 is located between the first boundary line 31 and the second boundary line 32.

When the upper side of the third bounding box 303 is located between the first boundary line 31 and the second boundary line 32 due to the movement in the direction closer to the user, the mobile robot 10 may determine that the photographing angle of the camera is appropriate, and may start learning for body recognition of the user.

Referring to (d) of FIG. 3, the fourth image captured through the camera of the mobile robot 10 when the photographing angle of the camera is the fourth angle is illustrated.

In the fourth image, the third bounding box 303 surrounding the body of the user may not be generated. In other words, when the photographing angle of the camera of the mobile robot 10 is the fourth angle, no users may exist in the fourth image. In this case, the mobile robot 10 may determine that the photographing angle of the camera is appropriate, and at the same time may be switched to a learning standby state without moving from a current location.

Figure 4:
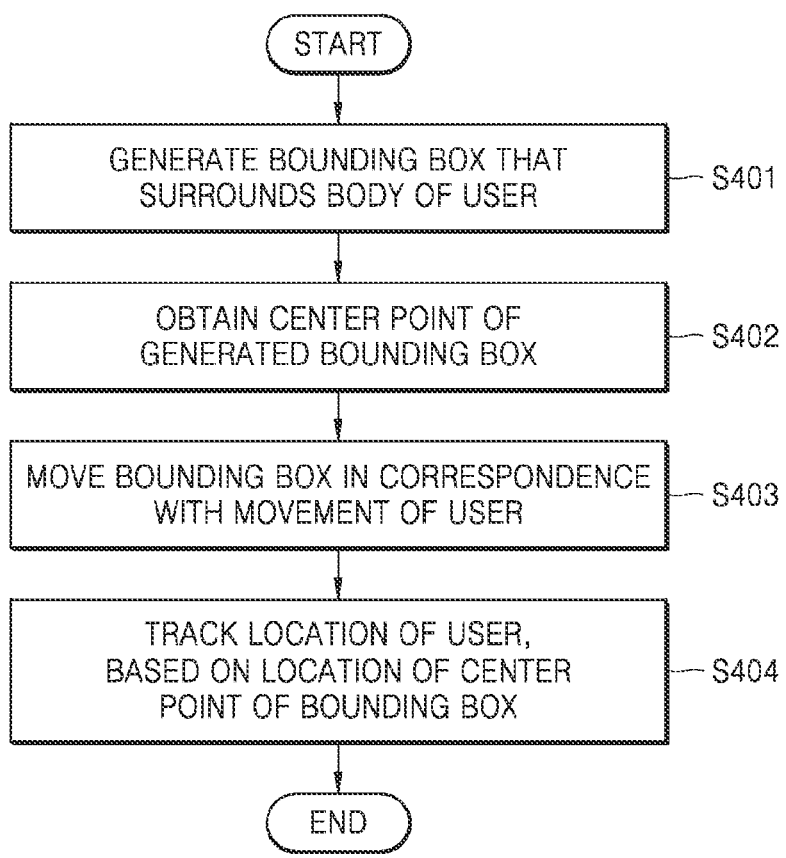
FIG. 4 is a flowchart of a method, performed by a mobile robot according to some embodiment, of tracking the location of a user within an image.

FIG. 4 is a flowchart of a method, performed by a mobile robot according to some embodiment, of tracking the location of a user within an image.

Referring to FIG. 4, in operation S401, the mobile robot 10 may generate a bounding box surrounding the body of the user, from a captured image.

In operation S402, the mobile robot 10 may obtain a center point of the generated bounding box.

In general, a bounding box used in detection of an object within an image is used to display the location of the object, and has an axis-aligned rectangular shape of which four sides are oriented in a vertical/horizontal direction on an image for each frame.

For example, the location of the bounding box may be determined by coordinate values (x1, y1) of the center point of the bounding box on the image for each frame. As another example, the location of the bounding box may be determined based on coordinate values (x2, y2) of a left upper corner of the bounding box on the image for each frame and coordinate values (x3, y3) of a right lower corner of the bounding box on the image for each frame.

When the location of the bounding box is determined by the coordinate values (x1, y1) of the center point of the bounding box, absolute values (w, h) of a height and a width of the bounding box or relative ratio values of the height and the width of the bounding box with respect to the entire image may be simultaneously used in displaying the bounding box.

In operation S403, the mobile robot 10 may move the bounding box within the image, in correspondence with the movement of the user. Finally, in operation S404, the mobile robot 10 may track a location of the user, based on a change in the location of the center point of the bounding box.

Figure 5:
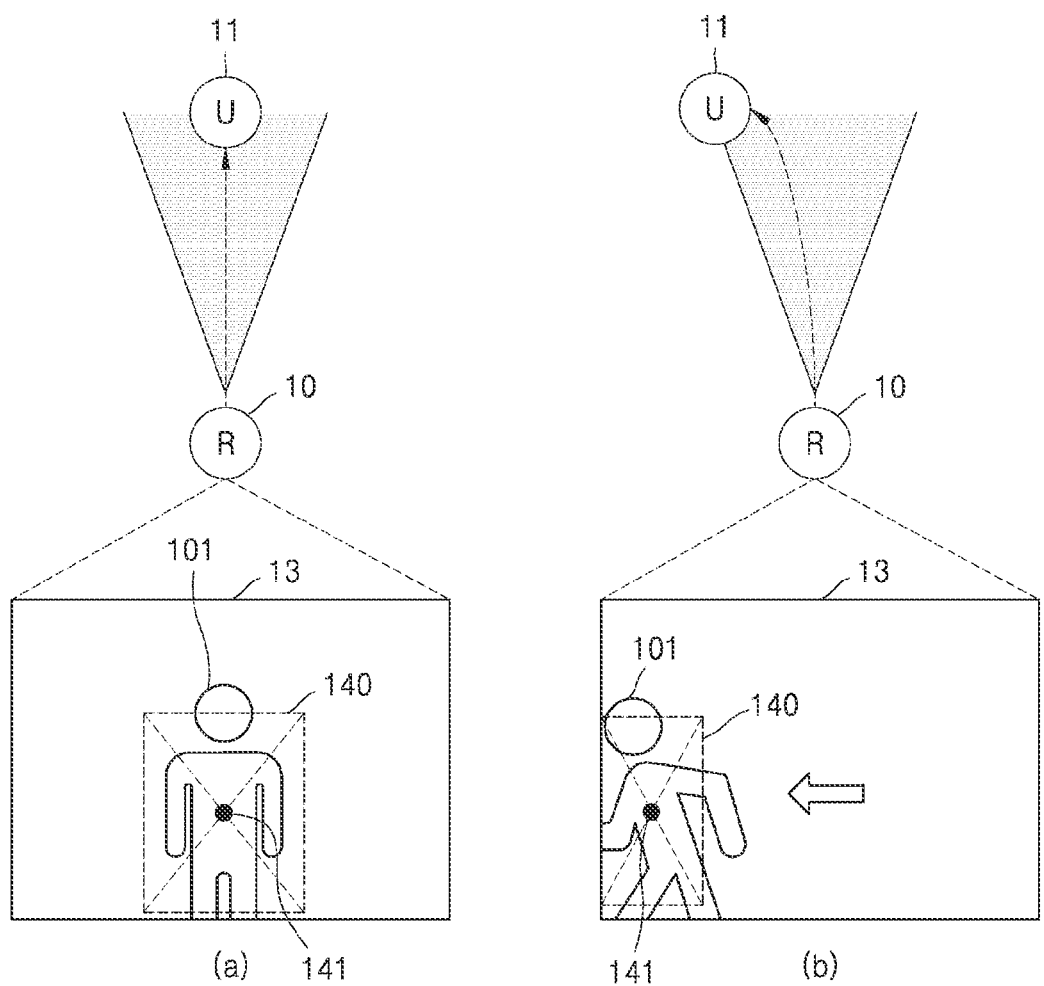
FIG. 5 illustrates an example in which a mobile robot according to some embodiments tracks the location of a user, based on a change in the location of the center point of a bounding box within an image.

FIG. 5 illustrates an example in which a mobile robot according to some embodiments tracks the location of a user, based on a change in the location of the center point of a bounding box within an image.

Referring to (a) of FIG. 5, the mobile robot 10 traveling by following the user 11 may generate a bounding box 140 surrounding the body of the user 101, in order to detect the user 101 from the image 13. When the bounding box 140 is generated, the mobile robot 10 may obtain a center point 141 of the bounding box 140.

Referring to (b) of FIG. 5, when the user 11 moves leftwards while the mobile robot 10 is following the user 11, a location of the user 101 detected from an image for each frame of the image 13 of the mobile robot 10 may move leftwards in correspondence with the movement of the user 11.

As the location of the user 101 moves to the left, the mobile robot 10 may generate a bounding box 140 that surrounds the body of the user 101 moved leftward for each of the respective images for the frames of the image 13. When the bounding box 140 is generated, the mobile robot 10 may obtain a center point 141 of the bounding box 140.

The location of the bounding box 140 generated on the image for each frame and the location of the center point 141 of the bounding box 140 may move leftwards in correspondence with the location of the user 101 moved leftwards within the image for each frames.

The mobile robot 10 may track the location of the user, based on a change in the location of the center point 141 of the bounding box 140 within the image 13.

For example, the mobile robot 10 may obtain the coordinate values (x1, y1) of the center points 141 of the bounding box 140 for each frame of the image 13. The mobile robot 10 may track an accurate location of the user 101 within an image, based on a change in the coordinate values (x1, y1) of the obtained plurality of center points 141.

Figure 6:
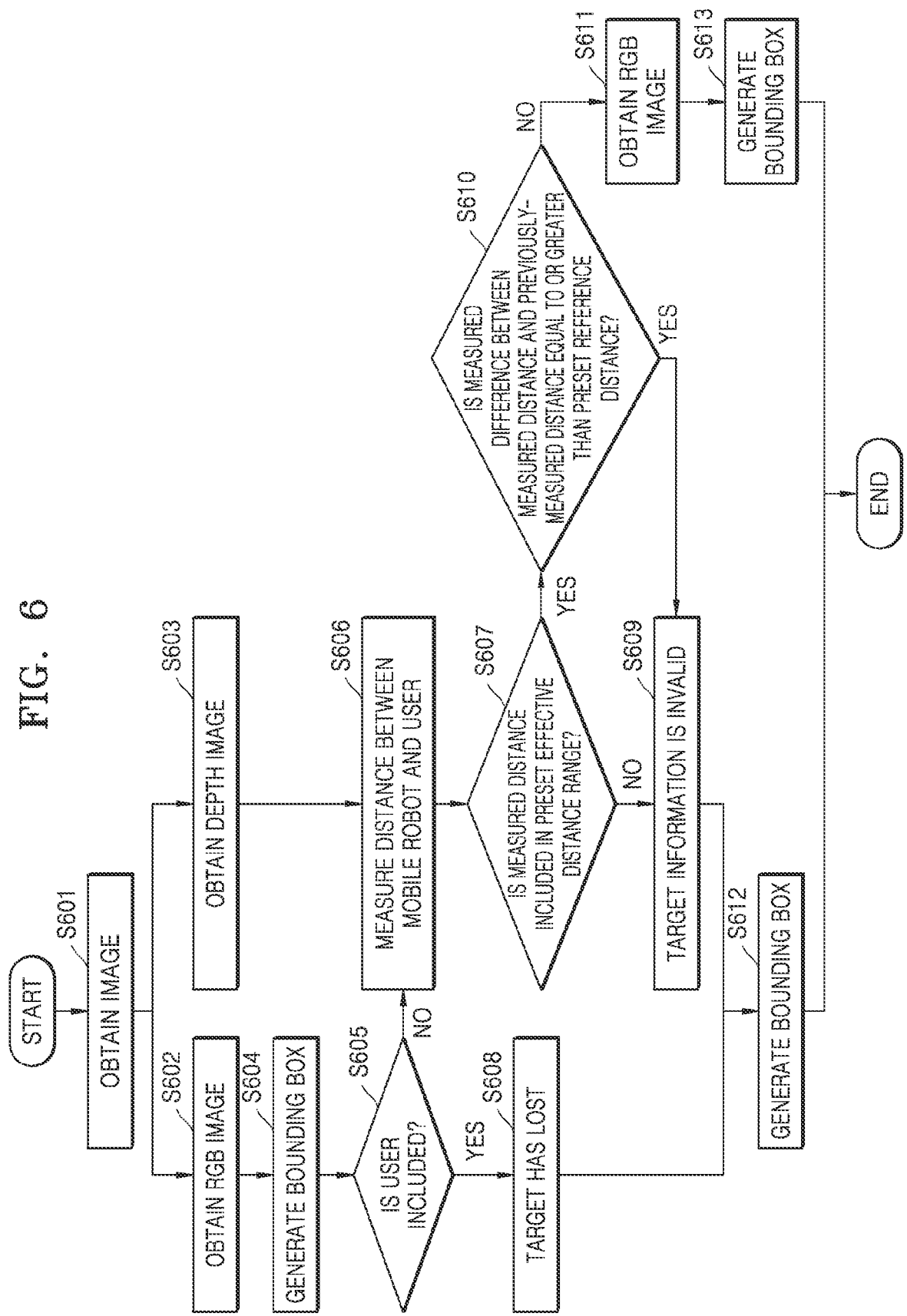
FIG. 6 is a flowchart of a method, performed by a mobile robot according to some embodiments, of determining whether to stop tracking of the location of a user, according to a preset criterion.

FIG. 6 is a flowchart of a method, performed by a mobile robot according to some embodiments, of determining whether to stop tracking of the location of a user, according to a preset criterion.

Referring to FIG. 6, in operation S601, the mobile robot 10 may obtain a surrounding image of the mobile robot 10, through at least one camera included in the mobile robot 10. In operation S602, the mobile robot 10 may obtain an RGB image from the obtained surrounding image.

In operation S603, the mobile robot 10 may obtain a depth image from the obtained surrounding image. For example, the mobile robot 10 may measure a distance between the mobile robot 10 and an object within an image, based on a depth image obtained from the image.

In operation S604, the mobile robot 10 may generate a bounding box surrounding the body of the user by using the RGB image obtained in operation S602. In operation S605, the mobile robot 10 may determine whether the user is included in the generated bounding box.

When it is determined in operation S605 that the user is not included in the generated bounding box, the mobile robot 10 may determine that the mobile robot 10 has lost the user who is to be tracked, in operation S608.

According to another embodiment, the mobile robot 10 may determine whether a bounding box exists in the image. For example, when the user moves and disappears to the outside of the image, the bounding box surrounding the user within the image may disappear.

As another example, when the user exists within the image but the mobile robot 10 fails in detection of the face or body of the user, the bounding box surrounding the user within the image may disappear. When it is determined that no bounding boxes exist in the image, the mobile robot 10 may determine that the mobile robot 10 has lost the user who is to be tracked.

The mobile robot 10, having determined in operation S608 that the mobile robot 10 has lost the user who is to be tracked, may stop location tracking of the user within the image, in operation S612.

On the other hand, when it is determined in operation S605 that the user is included in the generated bounding box, the mobile robot 10 may measure a distance between the mobile robot 10 and the user by using depth information obtained through the depth image generated in operation S603, in operation S606.

In operation S607, the mobile robot 10 may determine whether the measured distance between the mobile robot 10 and the user is included in a preset effective distance range.

For example, the mobile robot 10 may preset an effective distance range as a criterion for determining whether measurement information about the user is valid. For example, the effective distance range may be a range between a minimum effective distance where measurement and detection are possible through the depth image and a maximum effective distance for ignoring an object located at a relatively long distance from the mobile robot 10.

When it is determined in operation S607 that the measured distance between the mobile robot 10 and the user is not included in the preset effective distance range, the mobile robot 10 may determine that measurement information about the user who is to be tracked is invalid, in operation S609.

The mobile robot 10 having determined in operation S609 that the measurement information about the user who is to be tracked is invalid may stop location tracking of the user within the image, in operation S612.

On the other hand, when it is determined in operation S607 that the measured distance between the mobile robot 10 and the user is included in the preset effective distance range, the mobile robot 10 may determine whether a difference between the measured distance between the mobile robot 10 and the user and a previously-measured distance between the mobile robot 10 and the user is equal to or greater than a preset reference distance, in operation S610.

When it is determined in operation S610 that the difference between the measured distance between the mobile robot 10 and the user and the previously-measured distance between the mobile robot 10 and the user is equal to or greater than the preset reference distance, the mobile robot 10 may determine that measurement information about the user who is to be tracked is invalid, in operation S609.

For example, the difference between the measured distance between the mobile robot 10 and the user and the previously-measured distance between the mobile robot 10 and the user may have a distance equal to or greater than the preset reference distance, due to a detection/tracking error caused by at least one of a low frame rate, motion blur, and an illumination change.

As another example, the difference between the measured distance between the mobile robot 10 and the user and the previously-measured distance between the mobile robot 10 and the user may have a distance equal to or greater than the preset reference distance, due to at least one of damage to a separate distance measurement sensor, existence of another object within an effective sensing range, and generation of an error to a distance measured based on the depth image.

As another example, the difference between the measured distance between the mobile robot 10 and the user and the previously-measured distance between the mobile robot 10 and the user may have a distance equal to or greater than the preset reference distance, due to detection, tracking, or misrecognition of another user other than an existing user who is tracked.

On the other hand, when it is determined in operation S610 that the difference between the measured distance between the mobile robot 10 and the user and the previously-measured distance between the mobile robot 10 and the user is less than the preset reference distance, the mobile robot 10 may determine that measurement information about the user who is tracked is valid, in operation S611.

Finally, the mobile robot 10 having determined that the measurement information about the user who is tracked is valid may continue to track the location of the user within the image, in operation S613.

Figure 7:
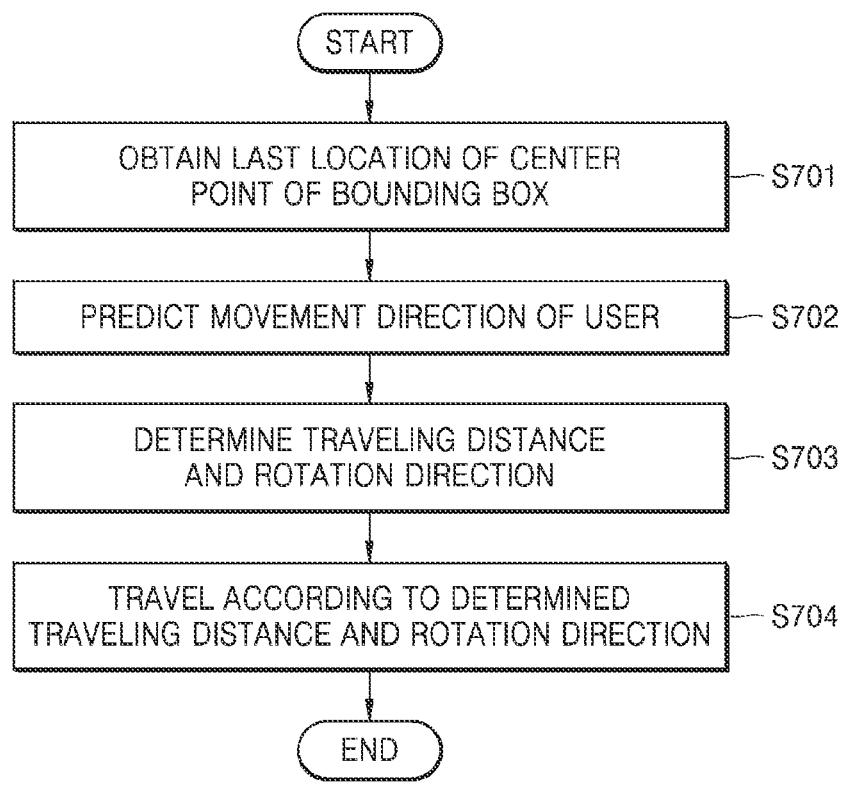
FIG. 7 is a flowchart of a method, performed by a mobile robot according to some embodiments, of determining a traveling path.

FIG. 7 is a flowchart of a method, performed by a mobile robot according to some embodiments, of determining a traveling path.

In operation S701, the mobile robot 10 may check a last location of the center point of a bounding box within an image.

In operation S702, the mobile robot 10 may predict a movement direction of a user, based on the checked last location of the center point of the bounding box.

An example of a method in which the mobile robot 10 predicts the movement direction of the user, based on the last location of the center point of the bounding box, and an example of a method in which the mobile robot 10 determines a rotation direction of the mobile robot 10 according to the predicted movement direction will be described later with reference to FIG. 8.

In operation S703, the mobile robot 10 may determine a traveling distance and a rotation direction of the mobile robot 10 according to the predicted movement direction of the user. The mobile robot 10 may determine a traveling path for continuing to travel by following the user according to the predicted movement direction of the user.

For example, the mobile robot 10 may determine a distance to be traveled before the mobile robot 10 rotates along with the user, based on a distance between the mobile robot 10 and the user obtained from a depth image. For example, the mobile robot 10 may also determine a rotation direction in which the mobile robot 10 is to rotate along with the user, based on the predicted movement direction of the user.

In other words, the mobile robot 10 may obtain the distance between the mobile robot 10 and the user from the image, and predict the movement direction of the user through the last location of the center point of the bounding box, thereby determining an optimal traveling path for rotating in the rotation direction determined according to the predicted movement direction of the user after traveling the traveling distance determined based on the obtained distance between the mobile robot 10 and the user.

The mobile robot 10 according to an embodiment may set different traveling paths, based on each preset following traveling mode.

For example, when a following traveling mode of the mobile robot 10 is a traveling mode where it is preferable that the face of a user continuously exists in the image during following traveling (for example, a video calling traveling mode), the mobile robot 10 may set a traveling speed to be equal to a movement speed of the user, and may set a distance between the user and the mobile robot 10 during traveling to be a distance enabling the face of the user to be located at the center within the image during traveling.

As another example, when the following traveling mode of the mobile robot 10 is a traveling mode where it is preferable that the body of the user continuously exists in the image during following traveling (for example, a simple user-following mode or a load carrying mode), the mobile robot 10 may maintain the traveling speed to be equal to the movement speed of the user, and may set the distance between the user and the mobile robot 10 during traveling to be a distance enabling the body of the user to be located at the center within the image.

As another example, when the following traveling mode of the mobile robot 10 is a mode that requires continuous outputting of a voice or music through a speaker of the mobile robot 10, the mobile robot 10 may maintain the traveling speed to be equal to the movement speed of the user, and may set the distance between the user and the mobile robot 10 during traveling to be a distance where a voice or music output through the speaker of the mobile robot 10 is best heard by the user.

As another example, when the following traveling mode of the mobile robot 10 is a mode that requires continuous outputting of a voice or music through a speaker of the mobile robot 10, the mobile robot 10 may set different traveling speeds and different traveling paths according to the characteristics of the voice or music through the speaker of the mobile robot 10 (for example, music of a fast beat and music of a slow beat). For example, the mobile robot 10 may set different traveling paths, based on a traveling pattern (for example, a straight line pattern, a curve pattern, and an S pattern) previously set according to the genre of the music output through the speaker of the mobile robot 10 (for example, a classic music, a song, and a hip-hop music).

In operation S703, the mobile robot 10 may travel according to the determined traveling distance and the determined rotation direction.

FIG. 8 illustrates an example where a mobile robot according to some embodiments determines a rotation direction and a camera angle adjustment direction of the mobile robot, based on a predicted movement direction of a user.

Referring to (a) of FIG. 8, an example of image segmentation areas that may be used by the mobile robot 10 to predict the movement direction of the user, based on the last location of the center point of a bounding box are illustrated.

For example, the mobile robot 10 may predict the movement direction of the user, based on one image segmentation area to which the last location of the center point of the bounding box belongs from among a plurality of image distinguishing areas. The plurality of image segmentation areas may include, for example, a left area L, a right area R, a left lower area BL, and a right lower area BR.

Referring to (b) of FIG. 8, the last location of the center point of the bounding box surrounding the body of the user within an image of the mobile robot 10 is illustrated. The last location of the center point of the bounding box refers to a center point location of the bounding box on an image of a last frame from among the frames having bounding boxes that surround the body of the user.

Referring to (a) and (b) of FIG. 8, the last location of the center point of the bounding box surrounding the body of the user within the image of the mobile robot 10 is included in the left area L from among the plurality of image distinguishing areas. The mobile robot 10 may predict the movement direction of the user as a left direction, in correspond to the left area L including the last location of the center point of the bounding box.

The mobile robot 10 may determine the rotation direction and the camera angle adjustment direction of the mobile robot 10, based on the predicted movement direction of the user. For example, the mobile robot 10 may determine the rotation direction and the camera angle adjustment direction of the mobile robot 10 by using a table showing a comparison between preset center point locations and rotation directions/camera angle adjustment directions.

Referring to (c) of FIG. 8, a table showing a comparison between center point locations and rotation directions/camera angle adjustment directions that may be used by the mobile robot 10 is illustrated.

For example, when the last location of the center point of the bounding box is included in the left area L from among the plurality of image distinguishing areas, the mobile robot 10 may determine the rotation direction of the mobile robot 10 as left rotation, and may not adjust the angle of the camera. For example, when the last location of the center point of the bounding box is included in the right area R from among the plurality of image distinguishing areas, the mobile robot 10 may determine the rotation direction of the mobile robot 10 as right rotation, and may not adjust the angle of the camera.

For example, when the last location of the center point of the bounding box is included in the left lower area BL from among the plurality of image distinguishing areas, the mobile robot 10 may determine the rotation direction of the mobile robot 10 as left rotation, and may determine the angle adjustment direction of the camera as down. For example, when the last location of the center point of the bounding box is included in the right lower area BR from among the plurality of image distinguishing areas, the mobile robot 10 may determine the rotation direction of the mobile robot 10 as right rotation, and may determine the angle adjustment direction of the camera as down.

Figure 9:
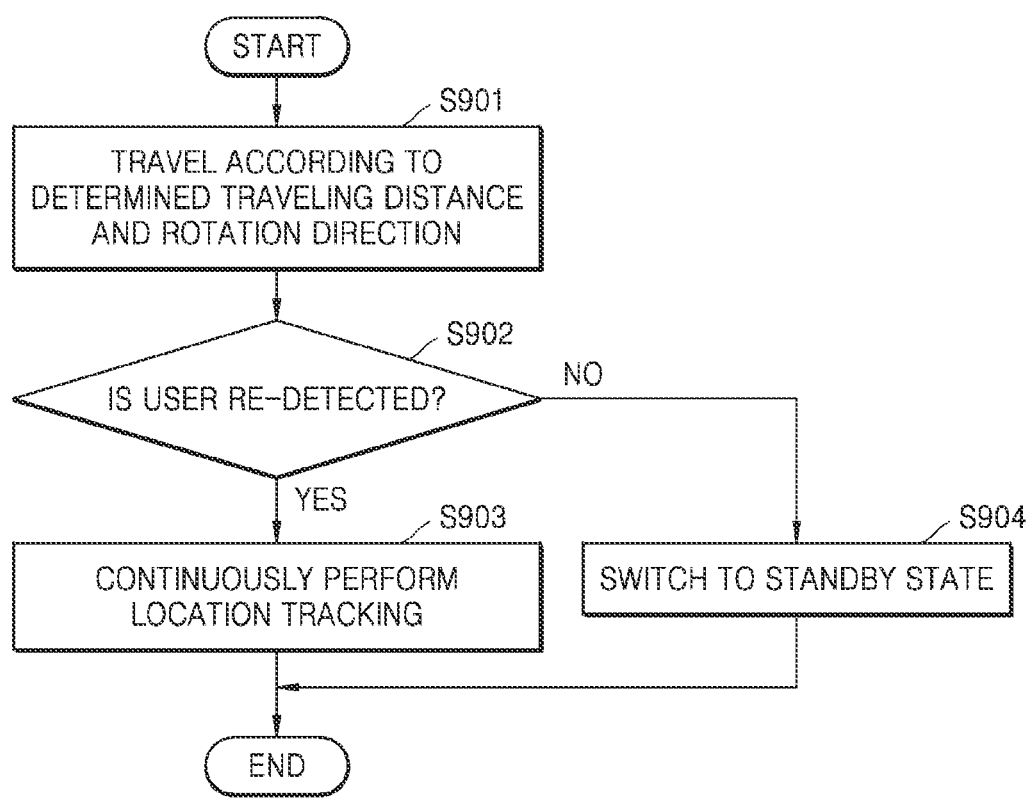
FIG. 9 is a flowchart of a method, performed by a mobile robot according to some embodiments, of determining whether to continue tracking, according to whether a user is re-detected.

FIG. 9 is a flowchart of a method, performed by a mobile robot according to some embodiments, of determining whether to continue tracking, according to whether a user is re-detected.

Referring to FIG. 9, in operation S901, the mobile robot 10 may travel according to a determined traveling distance and a determined rotation direction. In operation S902, the mobile robot 10 may determine whether the user is re-detected from an image, simultaneously with traveling along a traveling path.

In operation S902, the mobile robot 10 may determine whether the user is re-detected from an image, simultaneously with traveling along a traveling path.

For example, the mobile robot 10 may rotate in the determined rotation direction after moving the determined traveling distance, and at the same time may determine whether the user followed by the mobile robot 10 is included in an image captured by the camera of the mobile robot 10. In other words, the mobile robot 10 may determine whether the user is re-detected from the image, based on an image obtained in real time during rotation.

For example, the mobile robot 10 may rotate in the determined rotation direction one round, namely, 360 degrees, based on a camera direction when rotation starts, and at the same time may determine whether the user is re-detected from the image.

When it is determined in operation S902 that the user is re-detected from the image, the mobile robot 10 may continuously perform location tracking of the re-detected user.

For example, when the user is re-detected from the image while the mobile robot 10 is rotating one round in the determined rotation direction, the mobile robot 10 may continue location tracking and following tracking on the detected user.

On the other hand, when it is determined in operation S902 that the user is not re-detected from the image, the mobile robot 10 may stop traveling and may switch to a standby state.

On the other hand, when the user is not re-detected from the image while the mobile robot 10 is rotating one round in the determined rotation direction, the mobile robot 10 may stop traveling and may switch to a standby state. For example, the mobile robot 10 may output a voice notification indicating that tracking and following traveling with respect to the user are stopped, through a speaker included in the mobile robot 10. For example, the mobile robot 10 may output a message indicating that tracking and following traveling with respect to the user are stopped, through a display included in the mobile robot 10.

FIG. 10 illustrates an example of a controlling method according to obstacle recognition by a mobile robot according to some embodiments.

The mobile robot 10 according to an embodiment may include a separate obstacle sensor for sensing an object located in a lower portion and a close area of the mobile robot 10 where the object is not recognized through a depth image and an RGB image obtained through a camera.

For example, the mobile robot 10 may compare a distance between the mobile robot 10 and a user 11 obtained through the camera with a distance between the mobile robot 10 and an object obtained through the obstacle sensor, in order to distinguish a user being followed during traveling from an obstacle.

Referring to (a) of FIG. 10, a distance 1001 between the mobile robot 10 and the user 11 obtained through the camera and the mobile robot 10 may be equal to a distance 1001 between the mobile robot 10 and the object detected through the obstacle sensor.

When the distance 1001 between the mobile robot 10 and the user 11 obtained through the camera is equal to the distance 1001 between the mobile robot 10, namely, the user 11, and the object detected through the obstacle sensor, the mobile robot 10 may determine that the object detected through the obstacle sensor is the user 11, and may continue traveling.

Referring to (b) of FIG. 10, the distance 1001 between the mobile robot 10 and the user 11 obtained by the mobile robot 10 through the camera may not be equal to a distance 1002 between the mobile robot 10 and an object detected through the obstacle sensor.

When the distance 1001 between the mobile robot 10 and the user 11 obtained through the camera is not equal to the distance 1002 between the mobile robot 10 and the object detected through the obstacle sensor, the mobile robot 10 may determine that the object detected through the obstacle sensor is an obstacle 15, and may perform a control for avoiding the obstacle 15.

Figure 11:
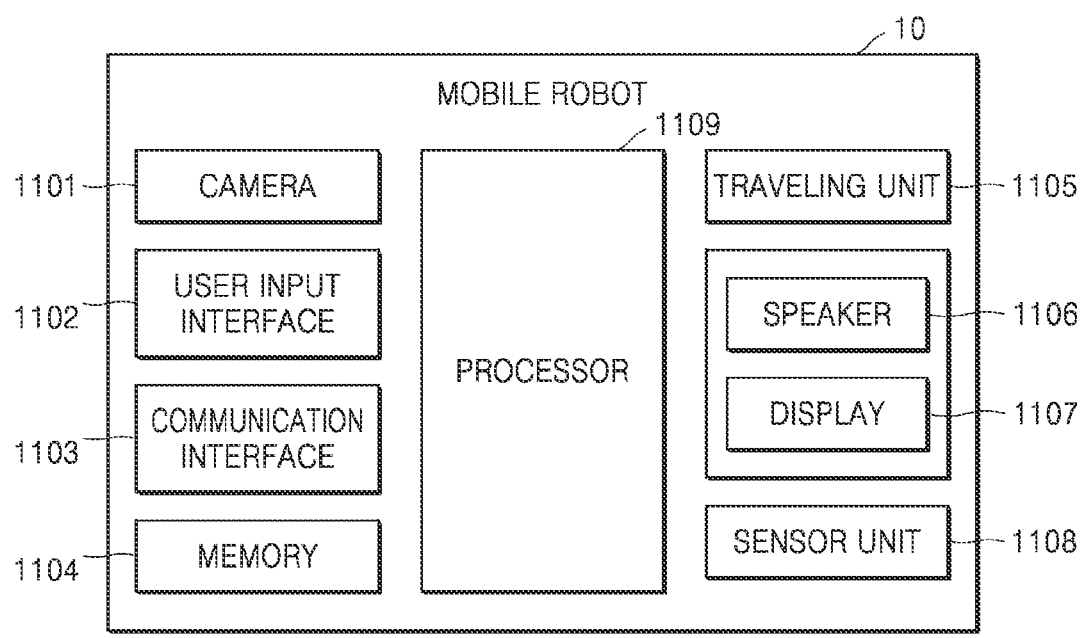
FIG. 11 is a block diagram of a mobile robot according to some embodiments.

FIG. 11 is a block diagram of a mobile robot 10 according to some embodiments.

Referring to FIG. 11, the mobile robot 10 may include a user input interface 1102, a communication interface 1103, a memory 1104, a camera 1101, a traveling unit 1105, a sensor unit 1108, a processor 1109, and an output interface. The output interface of the mobile robot 10 may include a speaker 1106 and a display 1107.

The user input interface 1102 may receive a user input for controlling an operation of the mobile robot 10. For example, the user input interface 1102 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The communication interface 1103 may include one or more communication modules for use in communication with devices such as a server and an external device for transmitting or receiving data necessary for traveling of the mobile robot 10. For example, the communication interface 1103 may include a short-range communication interface and a mobile communication interface. Examples of the short-range wireless communication interface may include, but are not limited to, a Bluetooth communication interface, a Bluetooth Low Energy (BLE) communication interface, a near field communication (NFC) interface, a wireless local area network (WLAN) (e.g., Wi-Fi) communication interface, a ZigBee communication interface, an infrared Data Association (IrDA) communication interface, a Wi-Fi direct (WFD) communication interface, an ultra-wideband (UWB) communication interface, and an Ant+ communication interface. The mobile communication interface may exchange a wireless signal with at least one selected from a base station, an external terminal, and a server on a mobile communication network. Here, examples of the wireless signal may include a voice call signal, a video call signal, and various types of data according to text/multimedia messages transmission.

The memory 1104 may store a program for controlling an operation of the mobile robot 10. The memory 1104 may include one or more instructions for controlling an operation of the mobile robot 10. For example, the memory 1104 may store map data about the shape of a certain space where the mobile robot 10 is located. For example, the memory 1104 may store a learning model for generating map data, and a learning model for determining a traveling path of the mobile robot 10. The programs stored in the memory 1104 may be classified into a plurality of modules according to their functions.

The memory 1104 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The camera 1101 may photograph the surroundings of the mobile robot 10. The camera 1101 may photograph the surroundings of the mobile robot 10 in real time while the mobile robot 10 is stopped or traveling.

The traveling unit 1105 may include at least one driving wheel for moving the mobile robot 10. The traveling unit 1105 may include a driving motor that is connected to the driving wheel and rotates the driving wheel. The driving wheel may include a left wheel and a right wheel respectively included on the left and right sides of the body of a robot cleaner. The left wheel and the right wheel may be driven by one driving motor. However, in some cases, a left wheel driving motor for driving the left wheel and a right wheel driving motor for driving the right wheel may be separately included. In this case, a traveling direction of the mobile robot 10 may be switched to the left side or the right side by differentiating rotation speeds of the left wheel and the right wheel from each other.

The speaker 1106 may output audio data received from the communication interface 1103 or stored in the memory 1104. The speaker 1106 may also output an audio signal (for example, a call signal receiving sound, a message receiving sound, a notification sound) related with a function of the mobile robot 10.

The display 1107 may display information that is processed by the mobile robot 10. For example, the display 1107 may display, for example, an interface for controlling the mobile robot 10 and an interface for displaying the status of the mobile robot 10.

When the display 1107 forms a layer structure together with a touch pad to construct a touch screen, the display 1107 may be used as an input device as well as an output device.

The sensor unit 1108 may include at least one sensor for sensing data related to an operation and status of the mobile robot 10 and obtaining data about the structure of a certain space where the mobile robot 10 travels. The sensor unit 1108 may include at least one of, for example, an infrared sensor, an ultrasonic sensor, an RF sensor, a geomagnetic sensor, and a position sensitive device (PSD) sensor.

The sensor unit 1108 may further include an obstacle sensor capable of sensing an obstacle around the mobile robot 10. The sensor unit 1108 may further include an operation sensor capable of sensing an operation of the mobile robot 10. For example, the sensor unit 1108 may include a gyro sensor, a wheel sensor, and an acceleration sensor.

The gyro sensor may sense a rotation direction and detect a rotation angle when the mobile robot 10 travels along a determined traveling path. The wheel sensor may be connected to the left wheel and the right wheel and detect the numbers of rotations of the left wheel and the right wheel. For example, the wheel sensor may be, but is not limited to, a rotary encoder.

The processor 1109 may control overall operations of the mobile robot 10. For example, the processor 1109 may control the camera 1101, the user input interface 1102, the communication interface 1103, the memory 1104, the traveling unit 1105, the sensor unit 1108, and the output interface by executing the programs stored in the memory 1104. The processor 1109 may control operations of the mobile robot 10 of FIGS. 1A through 10 by controlling the camera 1101, the user input interface 1102, the communication interface 1103, the memory 1104, the traveling unit 1105, the sensor unit 1108, and the output interface.

The processor 1109 may detect at least one of the body and the face of a user from an image of the surroundings of the mobile robot 10. The processor 1109 may generate a bounding box that surrounds the body of the user, may obtain a center point of the bounding box, and may track a location of the user, based on a location of the center point of the bounding box that moves within the image as the user moves.

The processor 1109 may measure a distance between the mobile robot 10 and the user, based on depth information obtained from the image.

When the body of the user does not exist in the bounding box or the measured distance between the mobile robot 10 and the user deviates from a preset effective distance range, the processor 1109 may stop tracking the location of the user.

The processor 1109 may periodically measure the distance between the mobile robot 10 and the user. When a difference between a currently-measured distance between the mobile robot 10 and the user and a previously-measured distance between the mobile robot 10 and the user is equal to or greater than a preset reference distance, the processor 1109 may stop tracking the location of the user.

The processor 1109 may predict a movement direction of the user, based on a last location of the center point of the bounding box within the image.

The processor 1109 may determine at least one of a traveling distance and a rotation direction of the mobile robot 10 according to the measured distances between the mobile robot 10 and the user and the predicted movement direction of the user. When the user is not re-detected from the image as a result of the mobile robot 10 traveling along the determined traveling path, the processor 1109 may switch to a standby state.

The above-described present disclosure may be replaced, modified, and changed within the scope of the technical spirit of the present disclosure by one of ordinary skill in the art to which the present disclosure pertains, and thus is not limited to the above-described embodiments and the accompanying drawings.

What is claimed is:

1. A method in which a mobile robot moves along with a user, the method comprising:
   photographing surroundings of the mobile robot;
   detecting the user from an image captured by the photographing;
   tracking a location of the user within the image as the user moves;
   when the tracking of the location of the user is stopped, predicting a movement direction of the user, based on a last location of the user within the image; and
   determining a traveling path of the mobile robot, based on the predicted movement direction of the user,
   wherein the tracking of the location of the user within the image further comprises:
      periodically measuring the distance between the mobile robot and the user; and
      when a difference between a currently-measured distance between the mobile robot and the user and a previously-measured distance between the mobile robot and the user is equal to or greater than a preset reference distance, stopping the tracking of the location of the user.

2. The method of claim 1, wherein the detecting of the user from the image comprises detecting at least one of a body or a face of the user from the image.

3. The method of claim 2, wherein the detecting of the user from the image further comprises adjusting an angle of a camera that captures the image, based on a location of the face of the user within the image.

4. The method of claim 1, wherein the detecting of the user from the image comprises generating a bounding box that surrounds body of the user, and
   the tracking of the location of the user within the image comprises:
      obtaining a center point of the bounding box; and
      tracking the location of the user, based on a location of the center point of the bounding box that moves within the image as the user moves.

5. The method of claim 4, wherein the tracking of the location of the user within the image comprises measuring the distance between the mobile robot and the user, based on depth information obtained from the image.

6. The method of claim 5, wherein the tracking of the location of the user within the image comprises, when the body of the user does not exist in the bounding box or the measured distance between the mobile robot and the user deviates from a preset effective distance range, stopping the tracking of the location of the user.

7. The method of claim 6, wherein the predicting of the movement direction of the user comprises predicting the movement direction of the user, based on a last location of the center point of the bounding box within the image.

8. The method of claim 7, wherein the determining of the traveling path of the mobile robot comprises determining at least one of a traveling distance or a rotation direction of the mobile robot according to the measured distance between the mobile robot and the user and the predicted movement direction of the user.

9. The method of claim 1, further comprising, when the user is not re-detected from the image as a result of the mobile robot traveling along the determined traveling path, switching to a standby state.

10. A mobile robot that moves along with a user, the mobile robot comprising:
- at least one camera;
- a memory storing one or more instructions; and
- at least one processor configured to execute the one or more instructions to control the mobile robot,
- wherein the at least one processor is configured to:
    - execute the one or more instructions to photograph surroundings of the mobile robot through the at least one camera,
    - detect the user from an image captured by the photographing,
    - track a location of the user within the image as the user moves,
    - as the user moves, periodically measure a distance between the mobile robot and the user within the image,
    - when a difference between a currently-measured distance between the mobile robot and the user and a previously-measured distance between the mobile robot and the user is equal to or greater than a preset reference distance, stop the tracking of the location of the user,
    - predict a movement direction of the user, based on a last location of the user within the image, when the tracking of the location of the user is stopped, and
    - determine a traveling path of the mobile robot, based on the predicted movement direction of the user.

11. The mobile robot of claim 10, wherein the at least one processor is configured to generate a bounding box that surrounds a body of the user, obtain a center point of the bounding box, and track the location of the user, based on a location of the center point of the bounding box that moves within the image as the user moves.

12. The mobile robot of claim 11, wherein the at least one processor is configured to measure the distance between the mobile robot and the user, based on depth information obtained from the image.

13. The mobile robot of claim 12, wherein the at least one processor is configured to, when the body of the user does not exist in the bounding box or the measured distance between the mobile robot and the user deviates from a preset effective distance range, stop tracking the location of the user.

14. A computer program device including a non-transitory computer-readable recording medium having recorded thereon a computer program, which, when executed by a computer, controls a mobile robot to perform operations comprising:
- photographing surroundings of the mobile robot;
- detecting the user from an image captured by the photographing;
- tracking a location of the user within the image as the user moves;
- when the tracking of the location of the user is stopped, predicting a movement direction of the user, based on a last location of the user within the image; and
- determining a traveling path of the mobile robot, based on the predicted movement direction of the user,
- wherein the tracking of the location of the user within the image further comprises:
    - periodically measuring the distance between the mobile robot and the user; and
    - when a difference between a currently-measured distance between the mobile robot and the user and a previously-measured distance between the mobile robot and the user is equal to or greater than a preset reference distance, stopping the tracking of the location of the user.

* * * * *